US011892783B2

(12) United States Patent
Goda

(10) Patent No.: US 11,892,783 B2
(45) Date of Patent: Feb. 6, 2024

(54) POWDER TRANSPORTING DEVICE, DEVELOPING DEVICE, AND IMAGE FORMING APPARATUS

(71) Applicant: FUJIFILM Business Innovation Corp., Tokyo (JP)

(72) Inventor: Toshihiro Goda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/828,010

(22) Filed: May 30, 2022

(65) Prior Publication Data

US 2023/0185218 A1 Jun. 15, 2023

(30) Foreign Application Priority Data

Dec. 14, 2021 (JP) ................................ 2021-202843

(51) Int. Cl.
*G03G 15/08* (2006.01)

(52) U.S. Cl.
CPC ................................ *G03G 15/0889* (2013.01)

(58) Field of Classification Search
CPC ........... G03G 15/0822; G03G 15/0889; G03G 15/0891; G03G 15/0893; G03G 2215/0819; G03G 2215/0822; G03G 2215/0827; G03G 2215/0838
See application file for complete search history.

(56) References Cited

U.S. PATENT DOCUMENTS

| | | | | |
|---|---|---|---|---|
| 8,666,288 | B2 | 3/2014 | Matsumoto et al. | |
| 2015/0177641 | A1* | 6/2015 | Tsukada ............ | G03G 15/0893 399/53 |

FOREIGN PATENT DOCUMENTS

| | | |
|---|---|---|
| JP | 2009098286 | 5/2009 |
| JP | 2012068616 | 4/2012 |
| JP | 2014078034 | 5/2014 |

* cited by examiner

*Primary Examiner* — Hoang X Ngo
(74) *Attorney, Agent, or Firm* — JCIPRNET

(57) ABSTRACT

A powder transporting device includes a first agitating and transporting section that agitates and transports powder, a receiving section that receives the powder from the first agitating and transporting section, a second agitating and transporting section that is arranged below the first agitating and transporting section in a vertical direction and agitates and transports the powder, an upward transport section that is arranged on a downstream side in a transport direction of the second agitating and transporting section and transports the powder transported from the second agitating and transporting section to the first agitating and transporting section above, and a speed increasing section that increases a rotation of a rotating shaft of any one of the first agitating and transporting section, the second agitating and transporting section, or the receiving section and transmits the rotation to the upward transport section.

14 Claims, 9 Drawing Sheets

POWDER TRANSPORTING DEVICE, DEVELOPING DEVICE, AND IMAGE FORMING APPARATUS

CROSS-REFERENCE TO RELATED APPLICATIONS

This application is based on and claims priority under 35 USC 119 from Japanese Patent Application No. 2021-202843 filed Dec. 14, 2021.

BACKGROUND

(i) Technical Field

The present invention relates to a powder transporting device, a developing device, and an image forming apparatus.

(ii) Related Art

In the related art, for example, techniques disclosed in JP2009-98286A, JP2012-68616A, and JP2014-78034A have already been proposed as a technique related to a developing device.

In JP2009-98286A, a device is configured such that a transport force from a first developer transport path toward a second developer transport path is applied to a developer at a first communication port, a communication port transport member that is a member separate from a first developer transport member and a second developer transport member is included, and communication port transport member control means for controlling the drive speed of the communication port transport member based on detection results from a toner concentration sensor is included.

In JP2012-68616A, a device is configured such that a plurality of pressing members that push up a developer by pressing from below as developer delivery means moves from below to above is included and the developer can pass from a surface side, which is an upper side of the pressing members, toward a surface side, which is a lower side, in a case where the pressing members press the developer.

In JP2014-78034A, a device is configured such that a communication portion has an inverted conical shape of which a lower side in a gravity direction is tapered, inside the communication portion, a carrying transport member that transports a developer toward a developer agitating member is provided separately from a developer agitating transport member, and the carrying transport member has, at the communication portion, a carrying transport capacity corresponding to the amount of the developer that can be transported toward the developer agitating transport member per unit time higher than an agitating transport capacity corresponding to the amount of the developer that can be transported in a transport direction by the developer agitating transport member per unit time.

SUMMARY

Aspects of non-limiting embodiments of the present disclosure relate to a powder transporting device, a developing device, and an image forming apparatus that improve upward transportability of powder to a first agitating and transporting section by an upward transport section regardless of the rotation speed of a second agitating and transporting section compared to a case where the upward transport section is fixed to a rotating shaft of the second agitating and transporting section.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a powder transporting device including a first agitating and transporting section that agitates and transports powder, a receiving section that receives the powder from the first agitating and transporting section, a second agitating and transporting section that is arranged below the first agitating and transporting section in a vertical direction and agitates and transports the powder, an upward transport section that is arranged on a downstream side in a transport direction of the second agitating and transporting section and transports the powder transported from the second agitating and transporting section to the first agitating and transporting section above, and a speed increasing section that increases a rotation of a rotating shaft of any one of the first agitating and transporting section, the second agitating and transporting section, or the receiving section and transmits the rotation to the upward transport section.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the drawings.

Exemplary Embodiment 1

Figure 1:
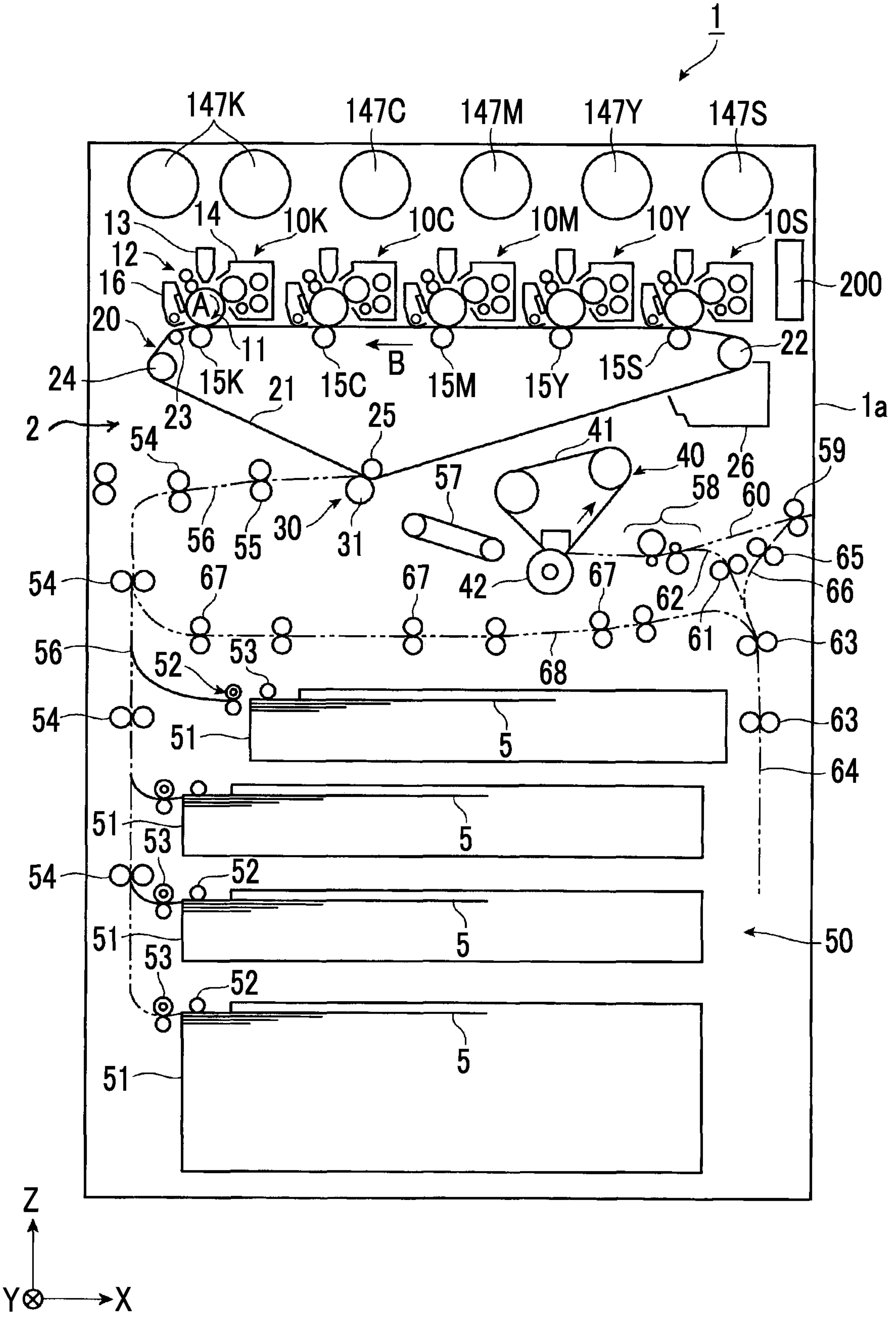
FIG. 1 is an overall configuration view showing an image forming apparatus to which a developing device according to exemplary embodiment 1 of the invention is applied.

FIG. 1 shows an image forming apparatus to which a powder transporting device and a developing device according to exemplary embodiment 1 are applied. In the drawings, a width direction of the image forming apparatus along a horizontal direction will be defined as an X-direction, a depth direction of the image forming apparatus along the horizontal direction will be defined as a Y-direction, and a height direction of the image forming apparatus along a vertical direction will be defined as a Z-direction.

Overall Configuration of Image Forming Apparatus

An image forming apparatus 1 according to exemplary embodiment 1 is configured as, for example, a color printer. The image forming apparatus 1 has an apparatus body 1*a* having a size along the X-direction which is the same as the size of a full-color machine of the related art and can simultaneously form an image having metallic colors such as gold (G) and silver (S), monochromatic colors such as red (R), green (G), and blue (B), corporate colors such as Mizuho Financial Group's cosmic blue and horizon red, and furthermore a specific color (hereinafter referred to as "spot color") that consists of various colors such as transparent and white, in addition to a full-color image that consists of four colors including yellow (Y), magenta (M), cyan (C), and black (K).

The image forming apparatus 1 includes a plurality of image forming devices 10 that form a toner image developed with a toner configuring a developer 4, an intermediate transfer device 20 that holds each toner image formed by each image forming device 10 and performs transportation to a secondary transfer position where the toner image is secondarily transferred to recording paper 5, which is an example of a recording medium, ultimately, a feeding device 50 that accommodates and transports the required recording paper 5 to be supplied to the secondary transfer position of the intermediate transfer device 20, and a fixing device 40 that fixes the toner image secondarily transferred to the recording paper 5 by the intermediate transfer device 20. The plurality of image forming devices 10 and the intermediate transfer device 20 configure an image forming unit 2 that forms an image on the recording paper 5. The apparatus body 1*a* of the image forming apparatus 1 is formed by a support structural member or an exterior cover. In addition, a two-dot chain line in FIG. 1 indicates a major transport path, through which the recording paper 5 is transported, in the apparatus body 1*a*.

The image forming device 10 is configured by four image forming devices 10Y, 10M, 10C, and 10K that exclusively form toner images having four colors including yellow (Y), magenta (M), cyan (C), and black (K) and an image forming device 10S that forms a toner image having spot color (S). The five image forming devices 10 (S, Y, M, C, and K) are arranged to be in a state of being arranged in one row along the X-direction in an internal space of the apparatus body 1*a*. In the shown exemplary embodiment, the spot color image forming device 10S is arranged on the most upstream side along a moving direction of an intermediate transfer belt 21 of the intermediate transfer device 20, and the yellow (Y), magenta (M), cyan (C), and black (K) image forming devices 10 (Y, M, C, and K) are arranged in turn along the moving direction of the intermediate transfer belt. However, the arrangement of the spot color image forming device 10S is not limited thereto, the spot color image forming device may be arranged on the most downstream side along the moving direction of the intermediate transfer belt or may be arranged between the yellow (Y), magenta (M), cyan (C), and black (K) image forming devices 10 (Y, M, C, and K).

Each of the image forming devices 10 (S, Y, M, C, and K) is configured the same except for the color of an image to be formed. Each of the image forming devices 10 (S, Y, M, C, and K) includes a rotating photoconductor drum 11 that is an example of an image holding body (image forming means). Each device, which is an example of the following image forming means, is generally arranged in the vicinity of the photoconductor drum 11. The major devices include a charging device 12 that charges a circumferential surface (image holding surface) of the photoconductor drum 11, on which image forming is possible, to a required potential, an exposure device 13 that irradiates the charged circumferential surface of the photoconductor drum 11 with light based on image information (signal) and forms an electrostatic latent image (for each color) having a potential difference, a developing device 14 (S, Y, M, C, and K) that is an example of a developing section developing the electrostatic latent image with a toner, which is the developer 4 having a corresponding color (S, Y, M, C, and K), and making a toner image, a primary transfer device 15 (S, Y, M, C, and K) that transfers each toner image to the intermediate transfer device 20, and a drum cleaning device 16 (S, Y, M, C, and K) that performs cleaning by removing an attached object such as a toner, which remains and is attached to the image holding surface of the photoconductor drum 11 after primary transfer.

The photoconductor drum 11 has an image holding surface formed to have a photoconductive layer (photosensitive layer) that consists of a photosensitive material on a circumferential surface of a cylindrical or columnar base material to be grounded. The photoconductor drum 11 is supported to rotate in a direction indicated by an arrow A as power is transmitted from a drive device (not shown).

The charging device 12 is configured by a contact-type charging roller 121 arranged in a state of being in contact with the photoconductor drum 11. A cleaning roller 122 that cleans a circumferential surface of the charging roller 121 is arranged on a back surface side of the charging roller 121. A charging voltage is supplied to the charging device 12. As the charging voltage, a voltage or a current having the same polarity as the charging polarity of a toner supplied from the developing device 14 is supplied in a case where the developing device 14 performs reversal development. A non-contact type charging device such as a scorotron arranged in a non-contact state with the surface of the photoconductor drum 11 may be used as the charging device 12.

The exposure device 13 consists of an LED print head that irradiates the photoconductor drum 11 with light according to image information with a light emitting diode (LED), which is a plurality of light emitting elements arranged along an axial direction of the photoconductor drum 11, and forms an electrostatic latent image. A device that performs deflection and scanning along the axial direction of the photoconductor drum 11 with laser light configured according to the image information may be used as the exposure device 13.

Figure 2:
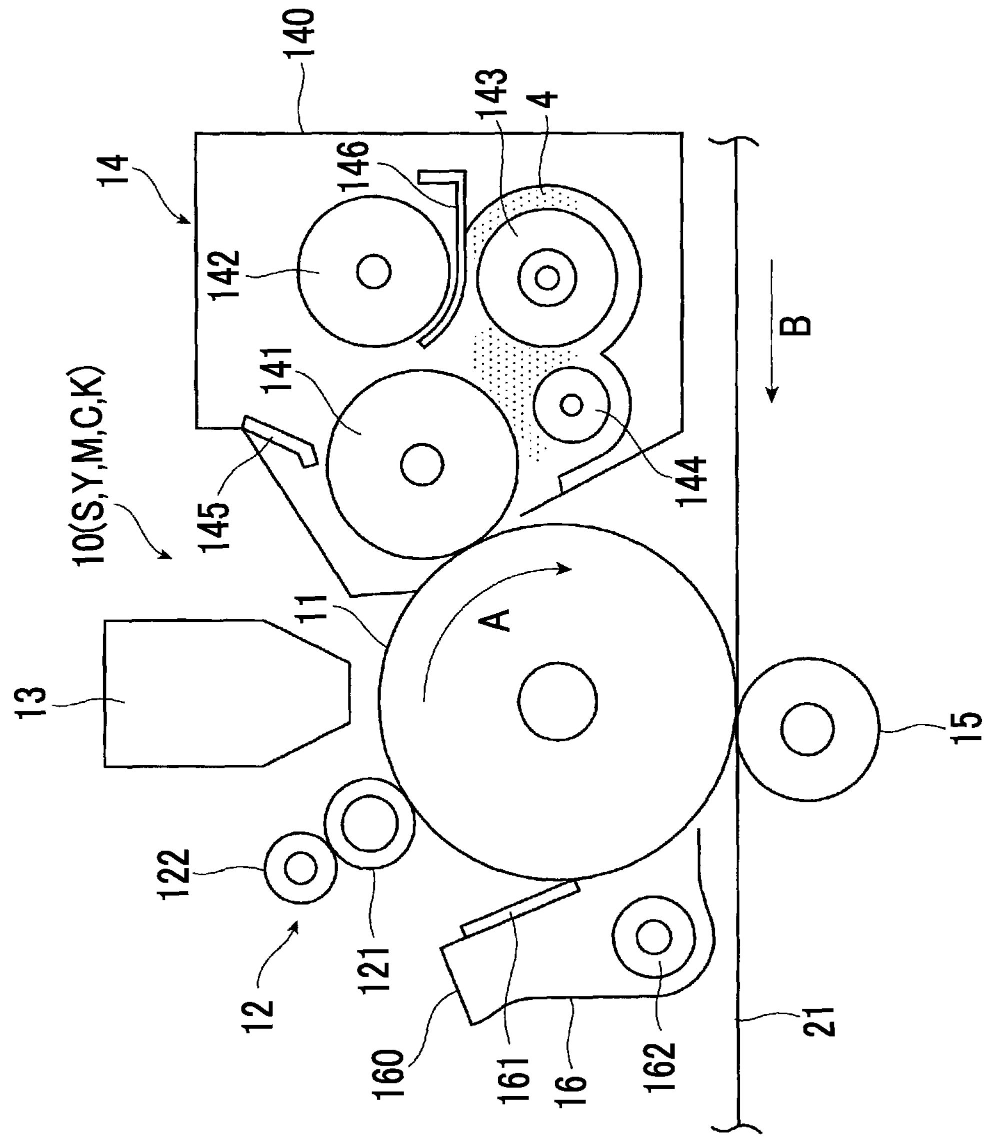
FIG. 2 is a cross-sectional configuration view showing an image forming device of the image forming apparatus according to exemplary embodiment 1 of the invention.

As shown in FIG. 2, each of the developing devices 14 (S, Y, M, C, and K) is configured by arranging, inside a housing 140 in which an opening portion and an accommodation chamber for the developer 4 are formed, a developing roller 141 that is an example of a developer holding body which holds and transports the developer 4 to a developing region facing the photoconductor drum 11, a supply auger 142 that is an example of an agitating and supplying section which transports the developer 4 such that the developer passes through and is supplied to the developing roller 141 while agitating the developer, an admix auger 143 that is an example of an agitating and transporting section which transports the developer 4 to the supply auger 142 while agitating the developer, a counter auger 144 that transports the developer 4 peeled off the developing roller 141 in an opposite direction to a transport direction of the admix auger 143, and a layer thickness regulating member 145 that regulates the amount (layer thickness) of the developer held by the developing roller 141. A developing voltage is supplied from a power supply device (not shown) to the developing device 14 between the developing roller 141 and the photoconductor drum 11. In addition, the developing roller 141, the supply auger 142, and the admix auger 143 rotate in a required direction as power is transmitted from the drive device to be described later. Further, a two-component developer containing a non-magnetic toner and a magnetic carrier is used as each of five colors of developers 4 (S, Y, M, C, and K). A configuration of the developing device 14 will be described in detail later.

The developing devices 14 (S, Y, M, C, and K), in particular, the spot color developing device 14S is configured to be attachable and detachable with respect to the apparatus body 1*a* of the image forming apparatus 1. The developing devices 14 (S, Y, M, C, and K) can be replaced with new developing devices 14 (Y, M, C, and K) and a developing device 14S having another spot color by a user.

The primary transfer devices 15 (S, Y, M, C, and K) each are a contact-type transfer device including a primary transfer roller, which is in contact with and rotates in the vicinity the photoconductor drum 11 via the intermediate transfer belt 21 and to which a primary transfer voltage is supplied. As the primary transfer voltage, a direct current voltage indicating a polarity opposite to the charging polarity of a toner is supplied from the power supply device (not shown).

The drum cleaning device 16 is configured by a container-shaped body 160 having a part opened, a cleaning plate 161 that is arranged to be in contact with the circumferential surface of the photoconductor drum 11 after primary transfer at a required pressure and performs cleaning by removing an attached object such as a remaining toner, and a sending member 162 such as a screw auger that collects and transports the attached object such as the toner removed by the cleaning plate 161 so as to be sent out to a collection system (not shown). A plate-shaped member (for example, a blade) that consists of a material such as rubber is used as the cleaning plate 161.

As shown in FIG. 1, the intermediate transfer device 20 is arranged to be at a position lower than each of the image forming devices 10 (S, Y, M, C, and K) along the Z-direction. The intermediate transfer device 20 is generally configured by the intermediate transfer belt 21 that rotates in a direction indicated by an arrow B while passing through a primary transfer position between the photoconductor drum 11 and the primary transfer device 15 (primary transfer roller), a plurality of belt support rollers 22 to 25 that hold the intermediate transfer belt 21 in an appropriate state from an inner surface thereof and rotatably support the intermediate transfer belt, a secondary transfer device 30 that is an example of secondary transfer means, which is arranged on an outer circumferential surface (image holding surface) side of the intermediate transfer belt 21 supported by the belt support roller 25 and secondarily transfers a toner image on the intermediate transfer belt 21 to the recording paper 5, and a belt cleaning device 26 that performs cleaning by removing an attached object such as a toner and paper dust which remain and are attached to the outer circumferential surface of the intermediate transfer belt 21 after passing through the secondary transfer device 30.

For example, an endless belt made of a material, in which a resistance adjusting agent such as carbon black is dispersed in a synthetic resin such as a polyimide resin and a polyamide resin, is used as the intermediate transfer belt 21. In addition, the belt support roller 22 is configured as a drive roller that is rotationally driven by the drive device (not shown) which also serves as a facing roller of the belt cleaning device 26, the belt support roller 23 is configured as a surface roller that forms an image forming surface of the intermediate transfer belt 21, the belt support roller 24 is configured as a tension applying roller that applies tension to the intermediate transfer belt 21, and the belt support roller 25 is configured as a facing roller that faces the secondary transfer device 30.

As shown in FIG. 1, the secondary transfer device 30 is a contact-type transfer device including a secondary transfer roller 31, which rotates while being in contact with the circumferential surface of the intermediate transfer belt 21 and to which a secondary transfer voltage is supplied, at the secondary transfer position which is an outer circumferential surface portion of the intermediate transfer belt 21 supported by the belt support roller 25 of the intermediate transfer device 20. In addition, a direct current voltage indicating an opposite polarity or the same polarity as the charging polarity of the toner is supplied as the secondary transfer voltage from the power supply device (not shown) to the secondary transfer roller 31 or the belt support roller 25 of the intermediate transfer device 20.

The fixing device 40 is configured by arranging, inside a housing (not shown) in which an introduction port and a discharge port for the recording paper 5 are formed, a heating belt 41 that rotates in a direction indicated by an arrow and is heated by heating means such that a surface temperature is maintained at a predetermined temperature and a pressurizing roller 42 that is in contact with the heating belt 41 at a predetermined pressure in a state of almost following an axial direction of the heating belt and is driven to rotate. In the fixing device 40, a contact portion where the heating belt 41 and the pressurizing roller 42 are in contact with each other is a fixing processing unit that performs required fixing processing (heating and pressurization).

The feeding device 50 is arranged to be at a position lower than the intermediate transfer device 20 along the Z-direction. The feeding device 50 is generally configured by a single (or plurality of) paper accommodating body 51 that accommodates the recording paper 5 of an appropriate size and type in a stacked state and sending devices 52 and 53 that send out the recording paper 5 one by one from the paper accommodating body 51. The paper accommodating body 51 is attached, for example, such that the paper accommodating body can be pulled to a front surface (a side surface facing a user during operation) side of the apparatus body 1*a*.

Examples of the recording paper 5 include thin paper, such as plain paper and tracing paper used in an electrophotographic copying machine or a printer, or an OHP sheet. In order to further improve smoothness of an image surface after fixing, although there is no particular limitation, for example, it is preferable that the surface of the recording paper 5 is also as smooth as possible, and for example, a so-called thick paper having a large basis weight, such as coated paper obtained by coating the surface of plain paper with a resin and printing art paper, can also be used.

The image forming apparatus 1 according to exemplary embodiment 1 is configured to be capable of forming an image on, as the recording paper 5, first thick paper having a basis weight of more than 106 gsm and 200 gsm or less and second thick paper having a basis weight of more than 200 gsm, in addition to plain paper having a basis weight of 106 gsm or less. The image forming apparatus 1 has at least a first process speed in a case of forming an image on plain paper, a second process speed in a case of forming an image on first thick paper, and a third process speed in a case of forming an image on second thick paper. The first process speed is set to the fastest, the second process speed is set to the second fastest, and the third process speed is set to the slowest. A control device 200 determines the type of the recording paper 5 and switches a process speed to the first to third process speeds. Drive speeds of the photoconductor drum 11, the developing device 14, and the fixing device 40 are switched according to the process speed.

A feeding transport path 56 configured by a single or a plurality of pairs of paper transport rollers 54 and 55 that transport the recording paper 5 sent out from the feeding device 50 to the secondary transfer position and a transport guide (not shown) is provided between the feeding device 50 and the secondary transfer device 30. The pair of paper transport rollers 55 arranged at a position immediately before the secondary transfer position in the feeding transport path 56 is configured as, for example, a roller (registration roller) that adjusts the transport timing of the recording paper 5. In addition, a transport belt 57 for transporting the recording paper 5 after secondary transfer, which is sent out from the secondary transfer device 30, to the fixing device 40 is provided between the secondary transfer device 30 and the fixing device 40. Further, a curl correcting device 58 that corrects the curl of the recording paper 5, on which fixing processing is performed by the fixing device 40, is arranged on a downstream side of the fixing device 40. In addition, a discharge transport path 60 including a pair of paper discharge rollers 59 for discharging the recording paper 5 sent out by the curl correcting device 58 after fixing to a paper discharge portion (not shown) provided in one side portion of the apparatus body 1*a* is provided at a portion close to the discharge port for paper formed in the apparatus body 1*a* of the image forming apparatus 1.

On the upstream side of the discharge transport path 60 along a transport direction of the recording paper 5, a branched transport path 62 including a pair of paper transport rollers 61 that branch the transport direction of the recording paper 5, which is sent out by the curl correcting device 58, obliquely downward is provided. A reversing transport path 64 including a pair of reverse rollers 63 that reverse the front and back of the recording paper 5 is arranged below the branched transport path 62. A discharge transport path 66 including a pair of paper discharge rollers 65 for discharging the recording paper 5 of which the front and back are reversed by the reversing transport path 64 to the paper discharge portion (not shown) and a double-sided transport path 68 including a pair of double-sided transport rollers 67 for forming an image on the back surface of the recording paper 5 of which the front and back are reversed by the reversing transport path 64 are formed above the reversing transport path 64 to branch.

The reference sign 200 in FIG. 1 indicates a control device that comprehensively controls an operation of the image forming apparatus 1. The control device 200 includes a central processing unit (CPU), a read only memory (ROM), a random access memory (RAM) (not shown), a bus that connects the CPU and ROM to each other, and a communication interface.

In exemplary embodiment 1, the photoconductor drum 11 and the developing device 14 are configured as separate units and are configured to be attachable and detachable with respect to the apparatus body 1*a* of the image forming apparatus 1. The photoconductor drum 11 configures a photoconductor unit together with the charging device 12 and the drum cleaning device 16. In addition, the developing device 14 independently configures a developing unit. In a case of being mounted on the apparatus body 1*a* of the image forming apparatus 1, the photoconductor unit and the developing unit are connected to the drive device (not shown) provided at the apparatus body 1*a* and are driven as a drive force is transmitted.

Operation of Image Forming Apparatus

Hereinafter, a basic image forming operation by the image forming apparatus 1 will be described.

Herein, an operation in a spot color+full-color mode in which a full-color image configured by combining toner images having four colors (Y, M, C, and K) and an image having spot color (S) are formed using the five image forming devices 10 (S, Y, M, C, and K) will be described.

In a case where the image forming apparatus 1 receives command information requesting for image information and a full-color image forming operation (print) from a personal computer (not shown) and an image reading device via a communication unit (not shown), the control device 200 starts the five image forming devices 10 (S, Y, M, C, and K), the intermediate transfer device 20, the secondary transfer device 30, and the fixing device 40.

As shown in FIG. 1, in each of the image forming devices 10 (S, Y, M, C, and K), first, each photoconductor drum 11 rotates in the direction indicated by the arrow A, each charging device 12 charges the surface of each photoconductor drum 11 to each of a required polarity (a negative polarity in exemplary embodiment 1) and a required potential. Next, the exposure device 13 irradiates the surface of the photoconductor drum 11 after charging with light emitted based on image information obtained by converting image information input to the image forming apparatus 1 into each of color components (S, Y, M, C, and K), and each electrostatic latent image having each color component configured by a required potential difference is formed on the surface.

Next, each of the image forming devices 10 (S, Y, M, C, and K) performs development by each supplying a toner having a corresponding color (S, Y, M, C, and K) charged to the required polarity (negative polarity) from the developing roller 141 and electrostatically attaching the toner to the electrostatic latent image having each color component, which is formed on the photoconductor drum 11. With the development, the electrostatic latent image having each color component formed on each photoconductor drum 11 is visualized as each toner image having each of five colors (S, Y, M, C, and K) developed with a toner having a corresponding color.

Next, in a case where the toner image having each color formed on the photoconductor drum 11 of each of the image forming devices 10 (S, Y, M, C, and K) is transported to the primary transfer position, each of the primary transfer devices 15 (S, Y, M, C, and K) primarily transfers the toner image having each color in a state of overlapping each other in turn to the intermediate transfer belt 21 of the intermediate transfer device 20, which rotates in a direction indicated by the arrow B.

In addition, in each of the image forming devices 10 (S, Y, M, C, and K) that have ended the primary transfer, the drum cleaning device 16 cleans the surface of the photoconductor drum 11 by scraping off and removing an attached object. Accordingly, each of the image forming devices 10 (S, Y, M, C, and K) is brought into a state where the next image formation operation can be performed.

Next, the intermediate transfer device 20 holds the toner image primarily transferred in response to the rotation of the intermediate transfer belt 21 and transports the toner image to the secondary transfer position. On the other hand, the feeding device 50 sends out the required recording paper 5 to the feeding transport path 56 in accordance with the image formation operation. In the feeding transport path 56, the pair of paper transport rollers 55, which are registration rollers, send out and supply the recording paper 5 to the secondary transfer position in accordance with a transfer timing.

At the secondary transfer position, the secondary transfer device 30 collectively and secondarily transfers the toner image on the intermediate transfer belt 21 to the recording paper 5. In addition, in the intermediate transfer device 20 that have ended the secondary transfer, the belt cleaning device 26 performs cleaning by removing an attached object such as a toner remaining on the surface of the intermediate transfer belt 21 after the secondary transfer.

Next, the recording paper 5 to which the toner image is secondarily transferred is transported to the fixing device 40 via the transport belt 57 after being peeled off the intermediate transfer belt 21. The fixing device 40 performs necessary fixing processing (heating and pressurization) and fixes an unfixed toner image to the recording paper 5 by causing the recording paper 5 after the secondary transfer to be introduced into and to pass through the contact portion between the rotating heating belt 41 and the pressurizing roller 42. Finally, the curl of the recording paper 5 after the fixing has ended is corrected by the curl correcting device 58, and for example, the recording paper is discharged to the paper discharge portion (not shown) provided at the one side portion of the apparatus body 1*a* by the pair of paper discharge rollers 59.

In addition, in a case where an image is formed on both surfaces of the recording paper 5, the recording paper 5 having one surface on which the image is formed is again transported to the secondary transfer device 30 via the reversing transport path 64 that reverses the front and back of the recording paper 5 and the double-sided transport path 68 without discharging the recording paper to the paper discharge portion (not shown), and a toner image is transferred to the back surface of the recording paper 5. The recording paper 5 having the back surface to which the toner image is transferred is transported to the fixing device 40 by the transport belt 57, is subjected to fixing processing (heating and pressurization) by the fixing device 40, and is discharged to the paper discharge portion (not shown) provided in a side surface of the image forming apparatus 1 by the pair of paper discharge rollers 59.

With the operation above, the recording paper 5, in which an image obtained by adding a spot color image to a full-color image configured by combining the toner images having five colors is formed on one surface or both surfaces, is output.

Configuration of Developing Device

Figure 3:
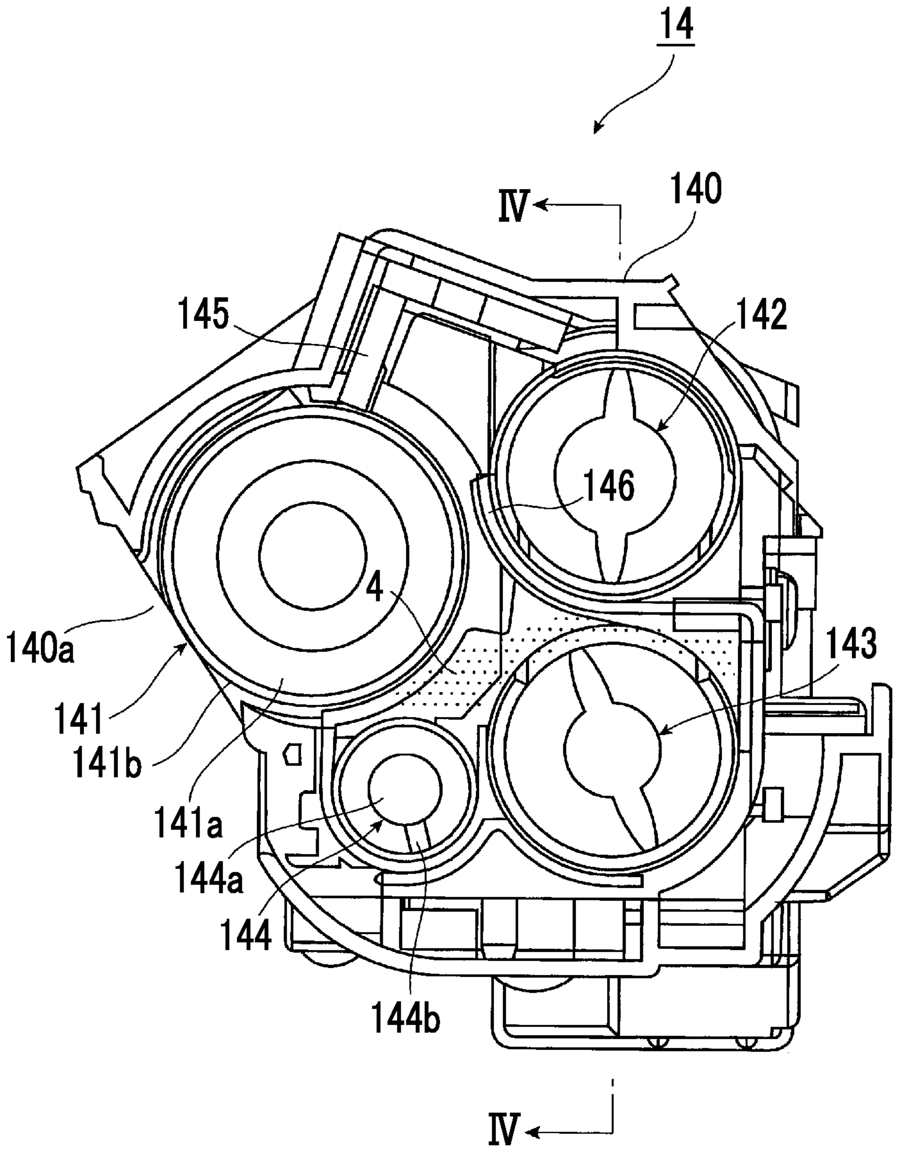
FIG. 3 is a vertical cross-sectional configuration view showing the developing device according to exemplary embodiment 1 of the invention.
Figure 4:
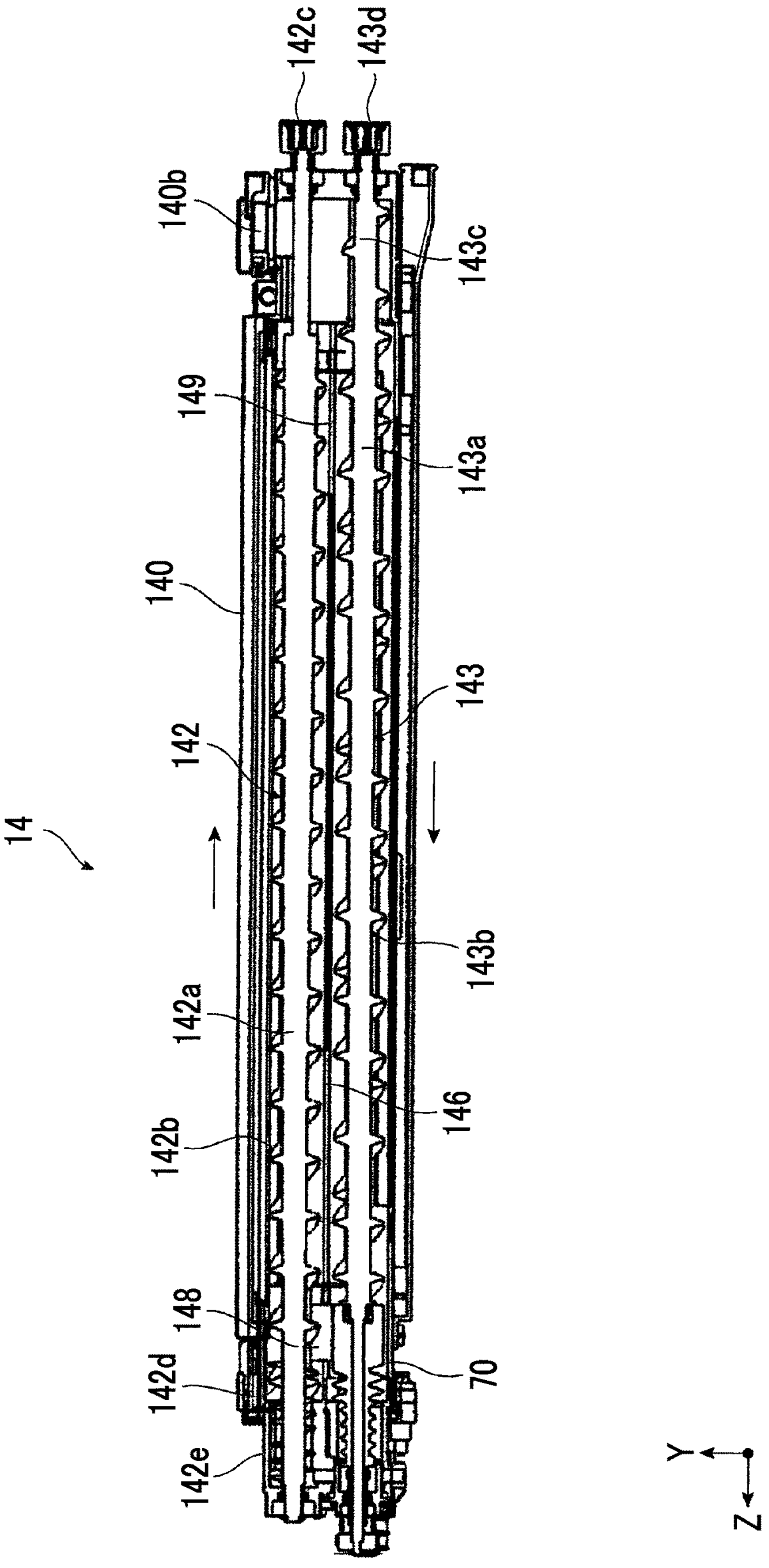
FIG. 4 is a cross-sectional view taken along line IV-IV of FIG. 3, which shows the developing device according to exemplary embodiment 1 of the invention.

FIG. 3 is a cross-sectional configuration view showing the developing device functioning as the powder transporting device according to exemplary embodiment 1, and FIG. 4 is a cross-sectional view taken along line IV-IV of FIG. 3.

As shown in FIGS. 3 and 4, the developing device 14 includes the elongated box-shaped housing 140 having a substantially rectangular cross-section in which the accommodation chamber for the developer 4, which is an example of powder, is provided therein. The housing 140 of the developing device 14 has an opening portion 140*a* in a side surface on a photoconductor drum 11 side. The developing roller 141, which is an example of the developer holding body (receiving section), is arranged in the opening portion 140*a* of the housing 140 to be rotatable in a counterclockwise direction in FIG. 3 such that a part thereof is exposed to the outside. The developing roller 141 is configured by a magnet roller 141*a* in which a plurality of magnets each having a polarity determined in advance are magnetized and arranged in a fixed manner at required positions along a circumferential direction and a cylindrical developing sleeve 141*b* that is arranged on an outer circumference of the magnet roller 141*a* to be rotatable in the counterclockwise direction in FIG. 3. At an upper portion of the developing roller 141, the layer thickness regulating member 145 that regulates the layer thickness of the developer 4 transported in a state of being held by the surface of the developing roller 141 is arranged to face the developing roller via a required gap.

In addition, the supply auger 142 that is an example of the agitating and supplying section (first agitating and transporting section), which transports the developer 4 to pass through the developing roller 141 while agitating the developer on the back surface side of the developing roller 141, is rotatably provided inside the housing 140 of the developing device 14. As shown in FIG. 4, the supply auger 142 is configured by a rotating shaft 142*a* and a spiral transport blade 142*b* formed integrally with an outer circumference of the rotating shaft 142*a*. In a case where the developing unit is mounted on the apparatus body 1*a* of the image forming apparatus 1, a coupling 142*c* to which a drive force is transmitted from the drive device (not shown) on an apparatus body 1*a* side is provided at one end portion of the supply auger 142 along an axial direction of the rotating shaft 142*a*. In addition, a collection auger 142*d* that transports some of the developer 4 transported by the supply auger 142 in an opposite direction to a transport direction of the transport blade 142*b* and collects the developer and a discharge auger 142*e* that causes the collected developer 4 transported by the collection auger 142*d* to fall downward by gravity while transporting the developer in an opposite direction to the collection auger 142*d* are provided at the other end portion of the supply auger 142 along the axial direction of the rotating shaft 142*a*.

Further, the admix auger 143 that is an example of an agitating and transporting section (second agitating and transporting section) which transports the developer 4 while agitating the developer is rotatably provided below the supply auger 142 along the vertical direction inside the housing 140 of the developing device 14. The admix auger 143 is configured by a rotating shaft 143*a* and a spiral transport blade 143*b* formed integrally with an outer circumference of the rotating shaft 143*a*. In addition, a supply auger 143*c* that transports a toner, which is supplied from a supply port 140*b* opened in one end portion of the housing 140, into the housing 140 is provided at one end portion of the admix auger 143 along an axial direction of the rotating shaft 143*a*. Further, a paddle member 70 that is an example of an upward transport section which transports the developer 4 transported by the admix auger 143 to the supply auger 142 located on an upper side along the vertical direction is arranged at the other end portion of the admix auger 143 along the axial direction of the rotating shaft 143*a*.

A partition wall 146 having an end portion on a developing roller 141 side, which is curved upward, is arranged between the supply auger 142 and the admix auger 143 in the horizontal direction. At both end portions of the partition wall 146 along a longitudinal direction thereof, first and second communication paths 148 and 149 that deliver the developer 4 between the supply auger 142 and the admix auger 143 are open as shown in FIG. 4.

The developer 4 transported to the supply auger 142 is supplied to the developing roller 141 while being transported along the axial direction by the supply auger 142. The developer 4 transported to the one end portion along the axial direction by the supply auger 142 is transported to the admix auger 143 via the second communication path 149.

The developer 4 that has been transported to the surface of the developing roller 141 and has contributed to development is peeled off the surface of the developing roller 141 by a peeling magnet (not shown) of the magnet roller 141*a*. As shown in FIG. 3, the counter auger 144 that is an example of an opposite direction transport section which transports the developer 4 in the opposite direction to the transport direction of the admix auger 143 is provided below the developing roller 141. The counter auger 144 is configured by a rotating shaft 144*a* and a spiral transport blade 144*b* formed integrally with an outer circumference of the rotating shaft 144*a*. The counter auger 144 is set to have an outer diameter smaller than the outer diameter of the admix auger 143. The developer 4 peeled off the surface of the developing roller 141 moves to the admix auger 143 while being transported in the opposite direction to the transport direction of the admix auger 143 by the counter auger 144.

Figure 5:
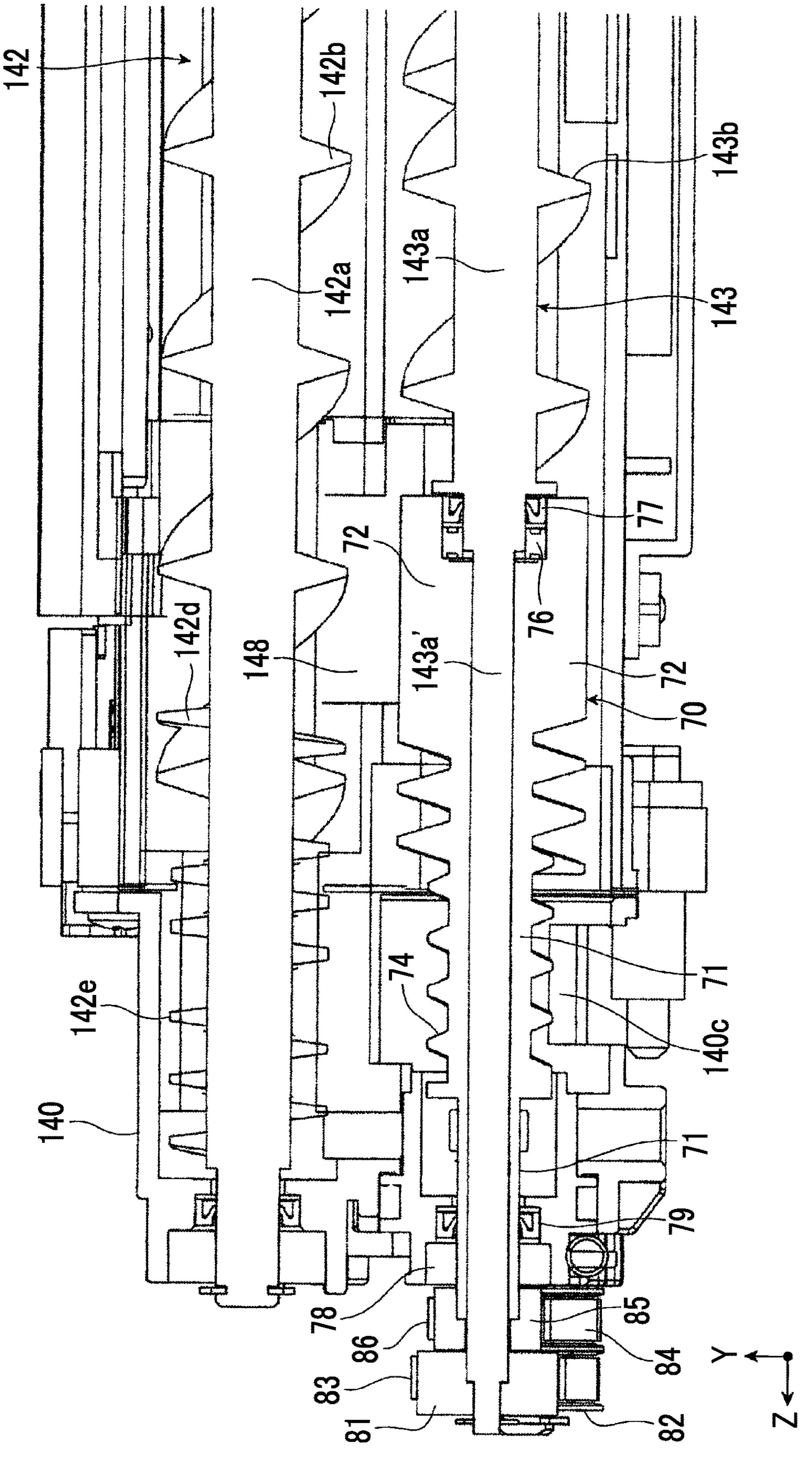
FIG. 5 is a cross-sectional configuration view showing major portions of the developing device according to exemplary embodiment 1 of the invention.
Figure 6:
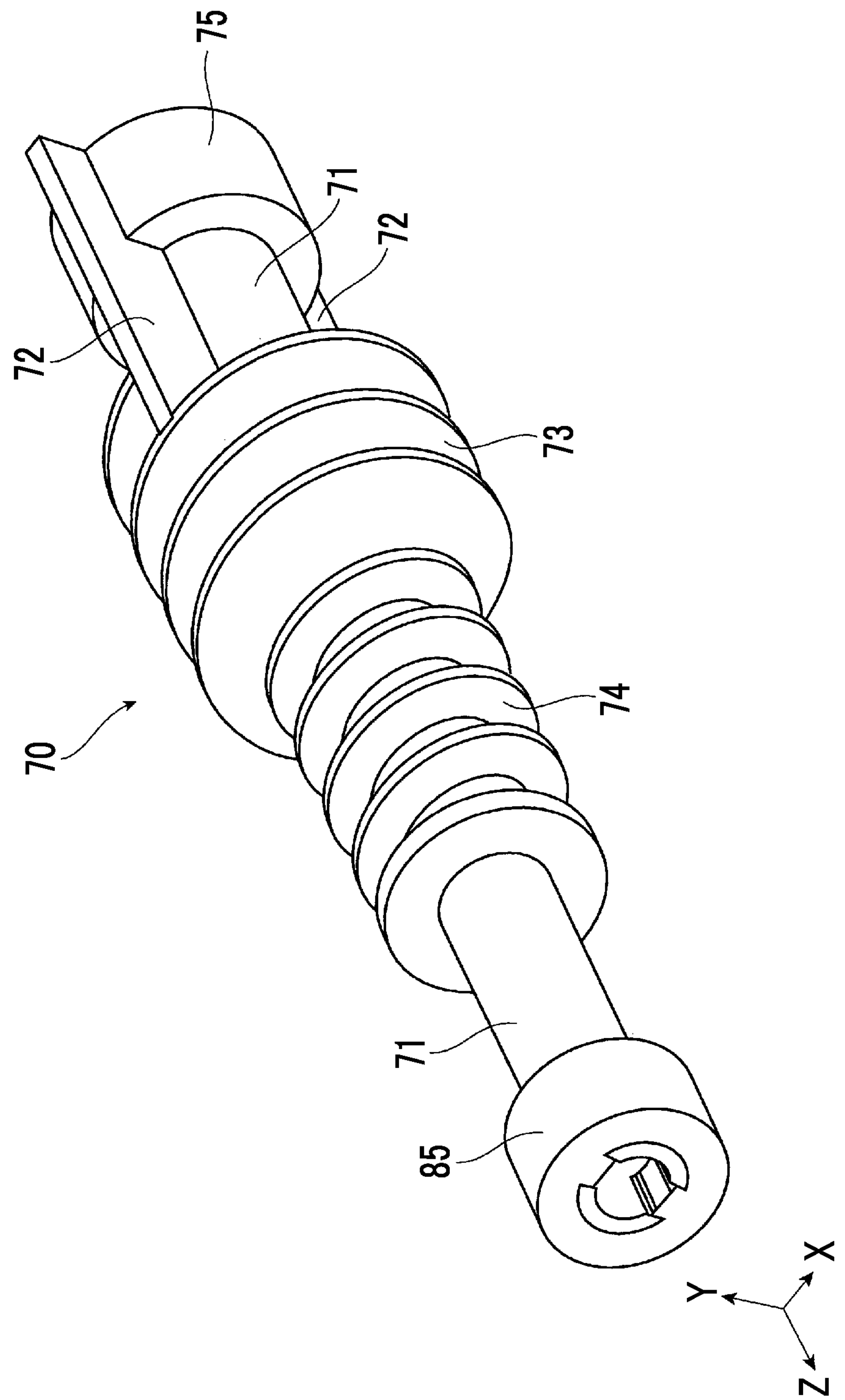
FIG. 6 is a perspective configuration view showing a paddle member.

As shown in FIGS. 5 and 6, the paddle member 70 is coaxially and rotatably attached to an end portion of the admix auger 143 on the downstream side along the axial direction via a shaft member 71. The paddle member 70 has a plurality of (two, in the shown example) flat plate members 72 facing radially outward provided at an end portion of the shaft member 71 on an admix auger 143 side along the axial direction to form a required angle (180 degrees in the shown example) along the circumferential direction with respect to each other. A cylindrical portion 75 formed to have a large outer diameter is provided at one end portion of the shaft member 71 of the paddle member 70 along the axial direction. A bearing member 76 for rotatably supporting an extension portion 143*a*', which is a portion of the rotating shaft 143*a* of the admix auger 143 of which an outer diameter is set to be small, and an oil seal member 77 that prevents infiltration of the developer 4 are arranged inside the cylindrical portion 75. In addition, a reverse auger 73 that transports the developer 4 transported by the admix auger 143 in an opposite direction along the axial direction is provided at a central portion of the paddle member 70 along the axial direction. Further, the paddle member 70 is integrally formed with a dissolving auger 74 that dissolves the developer 4 near an end portion of the reverse auger 73 along the axial direction and discharges the developer from a discharge port 140*c* below to the outside. The other end portion of the shaft member 71 of the paddle member 70 along the axial direction is rotatably supported by the housing 140 of the developing device 14 via a bearing member 78 and an oil seal member 79.

In the developing device of the related art, the paddle member 70 is provided integrally with the rotating shaft 143*a* of the admix auger 143. For this reason, in the image forming apparatus 1 to which the developing device 14 is applied, in a case where a process speed changes according to the type of the recording paper 5, the developing roller 141, the supply auger 142, or the admix auger 143 of the developing device 14 is rotationally driven at the process speed.

Figure 7:
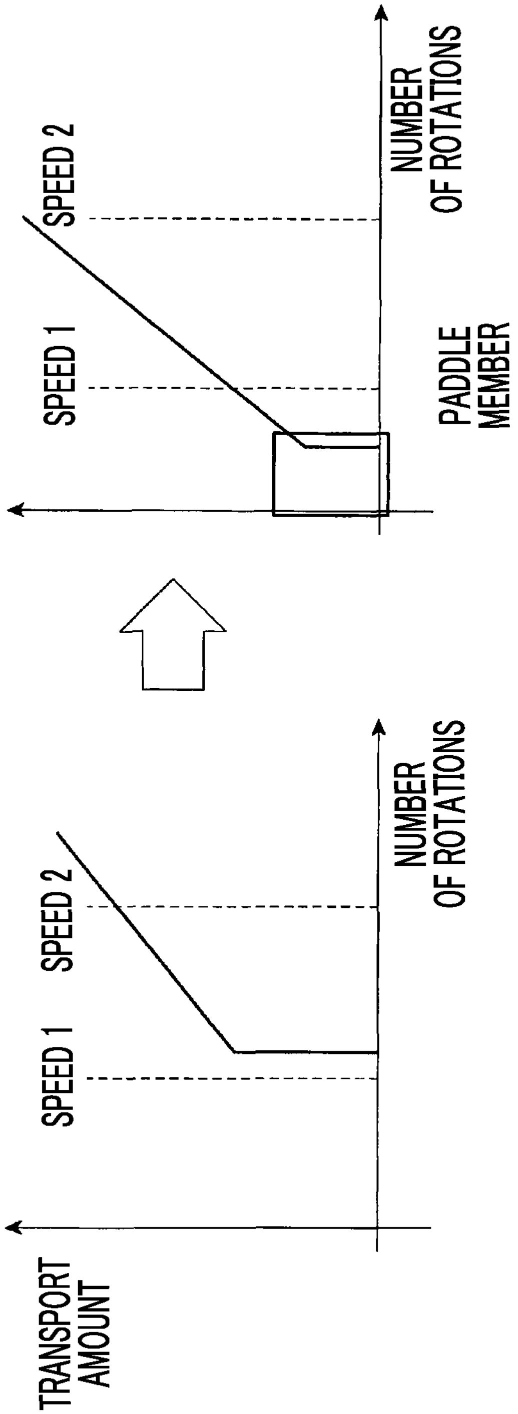
FIG. 7 is a graph showing operation of the developing device.

In a case where the recording paper 5 is the second thick paper having the greatest basis weight, the process speed of the image forming apparatus 1 is set to the slowest speed. Then, the developing device 14 is rotationally driven such that rotation speeds of the developing roller 141, the supply auger 142, and the admix auger 143 are the slowest speed. For this reason, the developing device 14 has technical problems in which in a case where the developer 4 transported to the end portion along the axial direction by the admix auger 143 is transported to the supply auger 142, which is located on the upper side along the vertical direction, by the paddle member 70 as shown in FIG. 7, a centrifugal force by the paddle member 70 is insufficient and in an extreme case, the developer 4 cannot be transported to the supply auger 142.

Thus, the developing device according to exemplary embodiment 1 is configured to include a speed increasing section that increases the rotation of the rotating shaft of any one of the agitating and transporting section, the agitating and supplying section, or the developer holding body and transmits the rotation to the upward transport section.

In addition, in the developing device according to exemplary embodiment 1, the speed increasing section is configured to increase the rotation of the rotating shaft of the agitating and transporting section.

Figure 8:
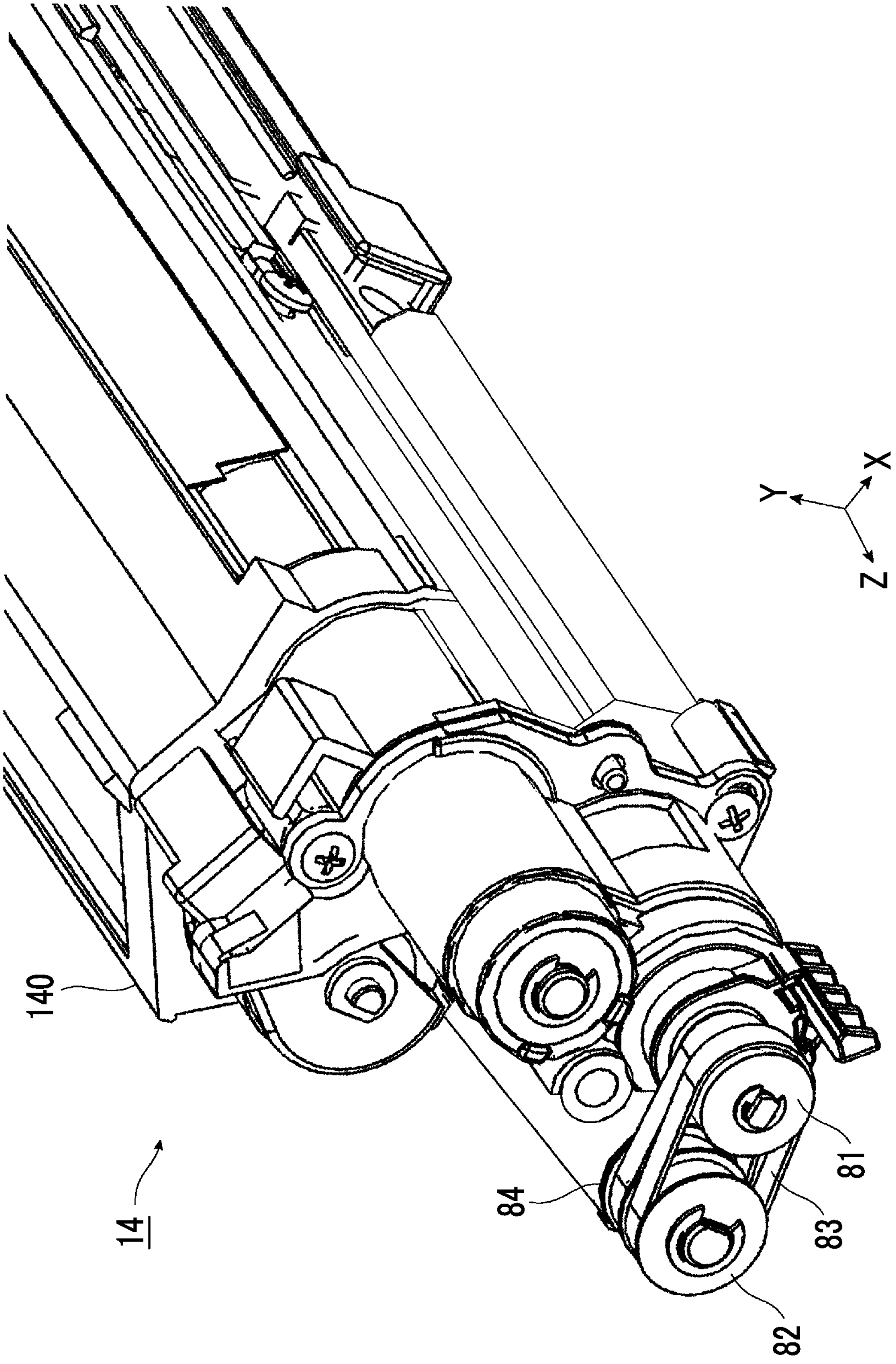
FIG. 8 is a perspective configuration view showing the major portions of the developing device according to exemplary embodiment 1 of the invention.
Figure 9:
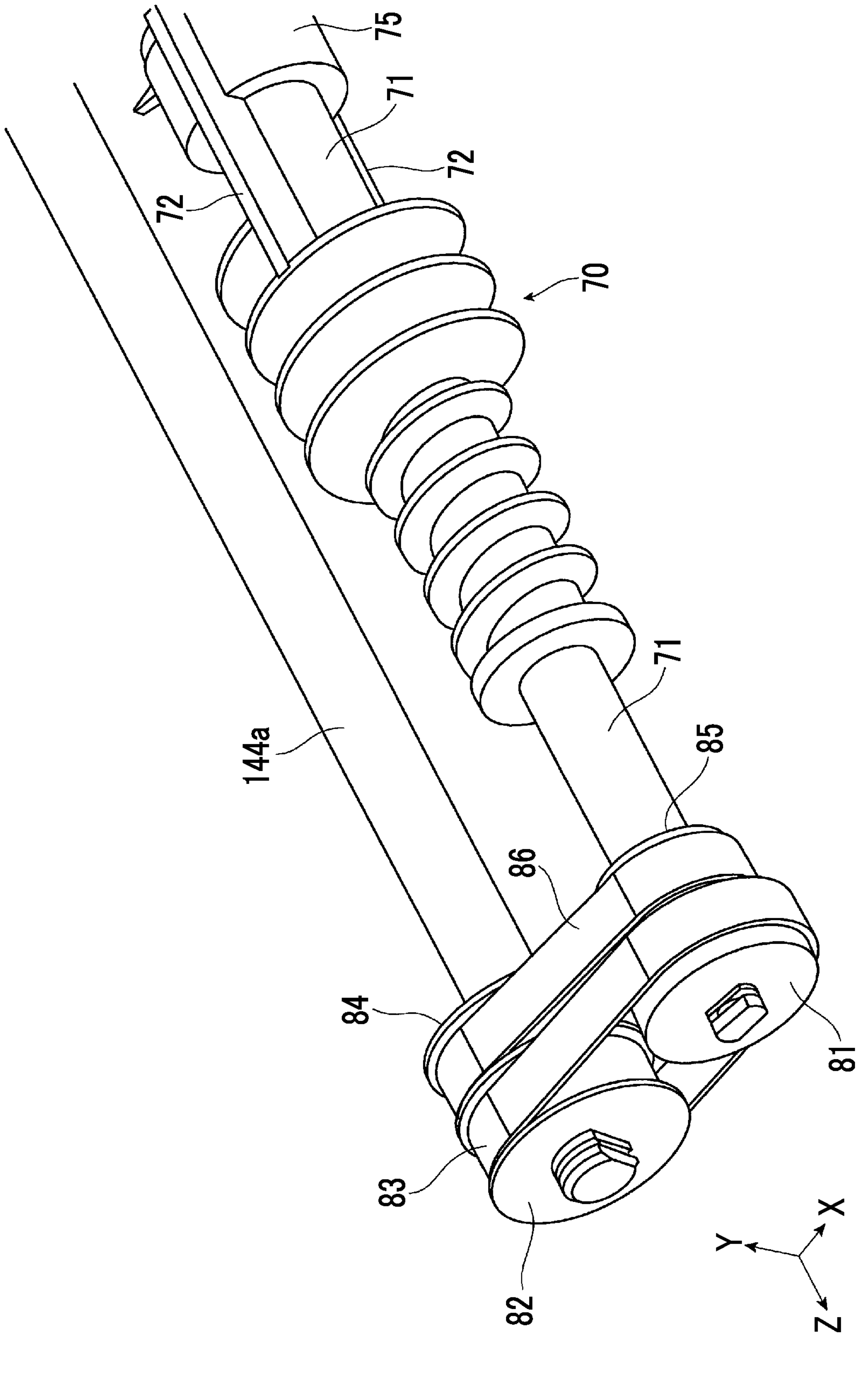
FIG. 9 is a perspective configuration view showing the major portions of the developing device according to exemplary embodiment 1 of the invention.

That is, in the developing device 14 according to exemplary embodiment 1, a first pulley 81 that is an example of the speed increasing section is attached to a tip of the paddle member 70 in the axial direction of the shaft member 71 in a fixed state as shown in FIGS. 8 and 9. A first belt 83 is hung on the first pulley 81 with a second pulley 82 fixed to the rotating shaft 144*a* of the counter auger 144. The first pulley 81 and the second pulley 82 are set to have the same outer diameter, and the counter auger 144 is rotationally driven at the same speed as the admix auger 143. The first and second pulleys 81 and 82 and the first belt 83 configure a first transmitting section.

A third pulley 84 that is an example of the speed increasing section is attached to the rotating shaft 144*a* that is an example of an intermediate shaft of the counter auger 144 in a fixed state. A second belt 86 is hung on the third pulley 84 with a fourth pulley 85 fixed to the shaft member 71 of the paddle member 70. The fourth pulley 85 is set to have an outer diameter smaller than the third pulley 84. The paddle member 70 is rotationally driven as a rotational drive force of the rotating shaft 144*a* of the counter auger 144 is increased and transmitted. The rotation speed of the paddle member 70 is set to 1.5 to 3.0 times the number of rotations of the rotating shaft 143*a* of the admix auger 143. In exemplary embodiment 1, the paddle member 70 is set to be rotationally driven at a rotation speed of 2.0 times the rotation speed of the rotating shaft 143*a* of the admix auger 143. In a case where the number of rotations of the admix auger 143 is 400 rpm, the number of rotations of the paddle member 70 is 800 rpm, which is 2.0 times greater. The third and fourth pulleys 84 and 85 and the second belt 86 configure a second transmitting section.

Operation of Developing Device

In the image forming apparatus 1 to which the developing device according to exemplary embodiment 1 is applied, as in the following, it is possible to improve upward transportability of the developer to the agitating and supplying section by the upward transport section regardless of the rotation speed of the agitating and transporting section, compared to a case where the upward transport section is fixed to the rotating shaft of the agitating and transporting section.

That is, in a case where the control device 200 determines that the recording paper 5 is the second thick paper, the image forming apparatus 1 according to exemplary embodiment 1 switches a process speed to the slowest third process speed, and the photoconductor drum 11, the developing device 14, or the fixing device 40 is driven.

Then, as shown in FIG. 3, in the developing device 14, the developing roller 141, the supply auger 142, or the admix auger 143 is rotationally driven at the slowest drive speed.

In the developing device 14 according to exemplary embodiment 1, as shown in FIG. 5, the paddle member 70 is rotatably mounted on the rotating shaft 143*a* of the admix auger 143 coaxially. The rotational drive force of the admix auger 143 is transmitted to the rotating shaft 144*a* of the counter auger 144 via the first pulley 81 and the first belt 83, which are attached to the rotating shaft 143*a*, and the counter auger 144 is rotationally driven along the same direction as the admix auger 143.

In addition, the rotational drive force of the counter auger 144 is transmitted to the fourth pulley 85 attached to the end portion of the shaft member 71 of the paddle member 70 via the third pulley 84 and the second belt 86 attached to the rotating shaft 144*a*, and the paddle member 70 is rotationally driven at a rotation speed of 2.0 times the number of rotations of the admix auger 143.

For this reason, even in a case where the process speed of the image forming apparatus 1 is set to a speed corresponding to the slowest second thick paper, in the developing device 14, the rotation speed of the admix auger 143 is increased, and the paddle member 70 is rotationally driven at a speed 2.0 times faster. Therefore, as shown in FIG. 7, in the developing device 14, the paddle member 70 is rotationally driven at a speed of 2.0 times the rotation speed of the admix auger 143, the developer 4 is reliably transported to the supply auger 142 located on the upper side along the vertical direction via the first communication path 148 by a centrifugal force applied by the flat plate member 72 of the paddle member 70.

As described above, in the developing device 14 according to exemplary embodiment 1, it is possible to improve upward transportability of the developer 4 to the supply auger 142 by the paddle member 70 regardless of the rotation speed of the admix auger 143, compared to a case where the paddle member 70 is fixed to the rotating shaft 143*a* of the admix auger 143.

Although the image forming apparatus that forms a full-color image has been described as an image forming apparatus in the exemplary embodiment, it is evident that the image forming apparatus may be a monochrome image forming apparatus.

In addition, although a case where the rotational drive force of the admix auger is first transmitted to the counter auger and then is increased and transmitted from the counter auger to the paddle member has been described in the exemplary embodiment, the rotational drive forces of the developing roller and the supply auger may be configured to be directly increased and transmitted to the paddle member.

In addition, although a case where the rotational drive force of the admix auger is first transmitted to the counter auger and then the speed increasing section consisting of the pulley and the belt is used in order to increase and transmit the rotational drive force from the counter auger to the paddle member has been described in the exemplary embodiment, the invention is not limited thereto, and a speed increasing section consisting of a combination of a plurality of gears may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A powder transporting device comprising:

a first agitating and transporting section that agitates and transports powder;

a receiving section that receives the powder from the first agitating and transporting section;

a second agitating and transporting section that is arranged below the first agitating and transporting section in a vertical direction and agitates and transports the powder;

an upward transport section that is arranged on a downstream side in a transport direction of the second agitating and transporting section and transports the powder transported from the second agitating and transporting section to the first agitating and transporting section above; and a speed increasing section that increases a rotation of a rotating shaft of any one of the first agitating and transporting section, the second agitating and transporting section, or the receiving section and transmits the rotation to the upward transport section, wherein the speed increasing section has a first transmitting section that increases a drive force of the rotating shaft of the second agitating and transporting section and transmits the drive force to an intermediate shaft, and a second transmitting section that transmits the drive force of the intermediate shaft to the upward transport section.

2. A developing device comprising:

a developer holding body that holds a developer;

an agitating and supplying section that agitates and supplies the developer to the developer holding body;

an agitating and transporting section that is arranged below the agitating and supplying section in a vertical direction and agitates and transports the developer;

an upward transport section that is arranged on a downstream side in a transport direction of the agitating and transporting section and transports the developer transported from the agitating and transporting section to the agitating and supplying section above; and a speed increasing section that increases a rotation of a rotating shaft of any one of the agitating and transporting section, the agitating and supplying section, or the developer holding body and transmits the rotation to the upward transport section, wherein the speed increasing section has a first transmitting section that increases a drive force of the rotating shaft of the second agitating and transporting section and transmits the drive force to an intermediate shaft, and a second transmitting section that transmits the drive force of the intermediate shaft to the upward transport section.

3. The developing device according to claim 2, wherein the speed increasing section increases the rotation of the rotating shaft of the agitating and transporting section.

4. An image forming apparatus comprising:
an image holding body that holds a latent image; and
a developing section that develops the latent image on the image holding body,
wherein the developing device according to claim 3 is used as the developing section.

5. The developing device according to claim 2, wherein the first and second transmitting sections consist of a combination of a pulley and a belt.

6. An image forming apparatus comprising:
an image holding body that holds a latent image; and
a developing section that develops the latent image on the image holding body,
wherein the developing device according to claim 5 is used as the developing section.

7. The developing device according to claim 2, further comprising:
an opposite direction transport section that is obliquely arranged below the developer holding body along the vertical direction and transports the developer in an opposite direction to the agitating and transporting section,
wherein the speed increasing section first transmits a drive force of the agitating and transporting section to a rotating shaft of the opposite direction transport section, increases a rotation of the rotating shaft of the opposite direction transport section, and transmits the rotation to the upward transport section.

8. An image forming apparatus comprising:
an image holding body that holds a latent image; and
a developing section that develops the latent image on the image holding body,
wherein the developing device according to claim 7 is used as the developing section.

9. The developing device according to claim 2, wherein the upward transport section is provided with a plurality of flat plate members facing radially outward on an outer circumference of a shaft member along a circumferential direction.

10. The developing device according to claim 9, wherein the upward transport section is driven with the number of rotations of 1.5 to 3.0 times the number of rotations of the rotating shaft of the agitating and transporting section.

11. An image forming apparatus comprising:
an image holding body that holds a latent image; and
a developing section that develops the latent image on the image holding body,
wherein the developing device according to claim 10 is used as the developing section.

12. An image forming apparatus comprising:
an image holding body that holds a latent image; and
a developing section that develops the latent image on the image holding body,
wherein the developing device according to claim 9 is used as the developing section.

13. An image forming apparatus comprising:
an image holding body that holds a latent image; and
a developing section that develops the latent image on the image holding body,
wherein the developing device according to claim 2 is used as the developing section.

14. A powder transporting device comprising:
first agitating and transporting means for agitating and transporting powder;
receiving means for receiving the powder from the first agitating and transporting means;
second agitating and transporting means for being arranged below the first agitating and transporting means in a vertical direction and agitating and transporting the powder;
upward transport means for being arranged on a downstream side in a transport direction of the second agitating and transporting means and transporting the powder transported from the second agitating and transporting means to the first agitating and transporting means above; and
speed increasing means for increasing a rotation of a rotating shaft of any one of the first agitating and transporting means, the second agitating and transporting means, or the receiving means and transmitting the rotation to the upward transport means,
wherein the speed increasing means has
a first transmitting means that increases a drive force of the rotating shaft of the second agitating and transporting means and transmits the drive force to an intermediate shaft, and
a second transmitting means that transmits the drive force of the intermediate shaft to the upward transport means.

* * * * *